United States Patent
Zhou

(10) Patent No.: US 10,176,304 B2
(45) Date of Patent: *Jan. 8, 2019

(54) METHOD AND APPARATUS FOR STORING REDEEM CODE, AND METHOD AND APPARATUS FOR VERIFYING REDEEM CODE

(71) Applicant: Tencent Technology (Shenzhen) Company Limited, Shenzhen (CN)

(72) Inventor: Jian Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/453,280

(22) Filed: Mar. 8, 2017

(65) Prior Publication Data

US 2017/0177838 A1 Jun. 22, 2017

Related U.S. Application Data

(63) Continuation of application No. 14/646,953, filed as application No. PCT/CN2013/084865 on Oct. 9, 2013, now Pat. No. 9,619,657.

(30) Foreign Application Priority Data

Nov. 23, 2012 (CN) .......................... 2012 1 0482877

(51) Int. Cl.
*G06F 21/10* (2013.01)
*G06F 17/30* (2006.01)
(Continued)

(52) U.S. Cl.
CPC ........ *G06F 21/10* (2013.01); *G06F 17/30946* (2013.01); *G06F 17/30985* (2013.01);
(Continued)

(58) Field of Classification Search
CPC .......... G06F 17/30985; H04L 12/1859; G06Q 20/387; G06Q 20/354; G06Q 30/0239; G06Q 30/0233
See application file for complete search history.

(56) References Cited

U.S. PATENT DOCUMENTS

| 8,087,074 B2 | 12/2011 | Popp et al. |
| 8,434,138 B2 | 4/2013 | Popp et al. |

(Continued)

FOREIGN PATENT DOCUMENTS

| CN | 101076807 A | 11/2007 |
| CN | 101651546 A | 2/2010 |

(Continued)

OTHER PUBLICATIONS

International Preliminary Report for Application No. PCT/CN2013/084865, dated May 26, 2015.

(Continued)

*Primary Examiner* — Daniel B Potratz
*Assistant Examiner* — Vu V Tran
(74) *Attorney, Agent, or Firm* — Oblon, McClelland, Maier & Neustadt, L.L.P.

(57) ABSTRACT

A method and an apparatus for storing a redeem code and a method and an apparatus for verifying a redeem code. The method for storing a redeem code includes generating a random value and determining an index of the random value according to an order in which the random value is generated, generating a number pair according to the random value and the index of the random value, mapping the number pair to a string and generating a redeem code according to the string, and determining a storage location of the random value according to the index of the random value, and saving the random value at the determined storage location.

6 Claims, 3 Drawing Sheets

(51) Int. Cl.
*G06Q 30/02* (2012.01)
*G06F 21/60* (2013.01)
(52) U.S. Cl.
CPC ......... *G06F 21/60* (2013.01); *G06Q 30/0207* (2013.01); *G06Q 30/0225* (2013.01); *G06F 2221/0753* (2013.01)

(56) References Cited

U.S. PATENT DOCUMENTS

| | | | |
|---|---|---|---|
| 2004/0268117 A1* | 12/2004 | Olivier | H04H 60/23 713/150 |
| 2010/0269174 A1 | 10/2010 | Shelest | |
| 2013/0062420 A1* | 3/2013 | Hamman | H04L 9/0866 235/494 |
| 2013/0124292 A1 | 5/2013 | Juthani | |
| 2016/0132871 A1* | 5/2016 | Bobrovnikoff | G06Q 20/28 705/71 |

FOREIGN PATENT DOCUMENTS

| | | |
|---|---|---|
| CN | 102332030 A | 1/2012 |
| CN | 102752115 A | 10/2012 |
| WO | 2012014231 A1 | 2/2012 |

OTHER PUBLICATIONS

Chinese Office Action for Application No. 201210482877.X dated Apr. 1, 2017, and an English concise explanation of relevance thereof.
International Search Report for PCT/CN2013/084865, ISA/CN, dated Jan. 16, 2014.

* cited by examiner

METHOD AND APPARATUS FOR STORING REDEEM CODE, AND METHOD AND APPARATUS FOR VERIFYING REDEEM CODE

CROSS-REFERENCE TO RELATED APPLICATIONS

This application is a continuation of U.S. National Phase patent application Ser. No. 14/646,953 filed on May 22, 2015, which is a national phase of International Patent Application No. PCT/CN2013/084865, filed on Oct. 9, 2013. This application claims the benefit and priority of Chinese Application No. 201210482877.X, filed Nov. 23, 2012. The entire disclosures of each of the above applications are incorporated herein by reference.

FIELD

The present disclosure relates to the field of information processing technologies and to a method and an apparatus for storing a redeem code, and a method and an apparatus for verifying a redeem code.

BACKGROUND

A redeem code is also known as a promo code or a promotion code, and is generally a code used by a developer to promote an actual product or a computer program product. A redeem code generally includes a digit, a character, and the like, for example, YWERE77RMJA9. A user can obtain a computer program or various other physical products by using a redeem code. After the user redeems a redeem code for a program or another physical product, the redeem code generally becomes invalid.

According to existing manners of generating and storing a redeem code, several strings are generated by using a random algorithm, the generated strings are used as redeem codes, and all the redeem codes are completely saved in storage space, for example, in a database. Correspondingly, during verification of a redeem code, the database is searched in a manner of string comparison, so as to determine whether the redeem code exists in the database, or determine whether the redeem code has already been redeemed.

According to the existing manner of generating a redeem code, in a case in which there are a very large quantity of redeem codes, repetition may also occur in randomly generated redeem codes, and therefore, during or after generation of redeem codes, removing a repetition of a generated redeem code is further needed, resulting in low efficiency of generating a redeem code. Moreover, because all redeem codes are completely saved in a database, a large amount of storage space is occupied. If the number of digits of a redeem code are reduced simply to save storage space, it cannot be ensured that a success rate of cracking a redeem code is controllable. Further, according to an existing manner of verifying a redeem code, a database, a file, or another storage medium needs to be searched in a manner of full-text comparison, resulting in a large amount of data to be searched and low efficiency of verification.

SUMMARY

This section provides a general summary of the disclosure, and is not a comprehensive disclosure of its full scope or all of its features.

The present disclosure provides a method and an apparatus for storing a redeem code, and a method and an apparatus for verifying a redeem code, thereby saving data storage space and improving efficiency of verifying a redeem code while ensuring that a success rate of cracking a redeem code is controllable.

A method for verifying a redeem code includes:
receiving a redeem code, a method for generating the redeem code including:
    generating a random value, and determining an index of the random value according to an order in which the random value is generated; and generating a number pair according to the random value and the index of the random value, mapping the number pair to a string, and generating the redeem code according to the string;
    acquiring the string according to the redeem code, reversely mapping the string to the number pair, and determining a storage location according to the index of the random value in the number pair; and
    further determining, when it is determined that a random value stored at the storage location is not redeemed, whether the random value in the number pair is consistent with the random value stored at the storage location, and if yes, determining that verification of the redeem code succeeds,
in which the generating a redeem code according to the string comprises:
performing obfuscation processing on the string, to generate the redeem code.

An apparatus for verifying a redeem code includes:
memory;
one or more processors; and
    one or more programs stored in the memory and configured for execution by the one or more processors, the one or more programs comprising the following instruction units:
a redeem code receiving unit, a storage location determining unit, and a verification unit,
    the redeem code receiving unit being configured to receive a redeem code, a method for generating the redeem code including:
    generating a random value, and determining an index of the random value according to an order in which the random value is generated; and generating a number pair according to the random value and the index of the random value, mapping the number pair to a string, and generating the redeem code according to the string;
    the storage location determining unit being configured to acquire the string according to the redeem code, reversely map the string to the number pair, and determine a storage location according to the index of the random value in the number pair; and
    the verification unit being configured to further determine, when it is determined that a random value stored at the storage location is not redeemed, whether the random value in the number pair is consistent with the random value stored at the storage location, and if yes, determine that verification of the redeem code succeeds,
in which the generating a redeem code according to the string comprises:
performing obfuscation processing on the string, to generate the redeem code.

As can be seen from the foregoing technical methods, according to the present disclosure, a redeem code is set to a mapping rule between a string and a number, and each redeem code consists of a pair of numbers, where one number is a random value, and the other number is an index related to an order in which the random value is generated. During a stage of generating a redeem code, a number pair is mapped to a string pair, and when the redeem code is saved, only a random value needs to be stored. Therefore, to ensure that a success rate of cracking a redeem code is controllable, data storage space may further be saved. Moreover, in the present disclosure, during a redeeming block, a string pair is mapped to a number pair for verification, thereby improving efficiency of verifying a redeem code. In addition, the present disclosure is applicable to various terminals, and the present disclosure may be used across platforms or across terminals, which achieves a very wide range of application.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To make the technical methods and advantages of the present disclosure clearer, the following further describes the present disclosure in detail with reference to the accompanying drawings.

Figure 1:
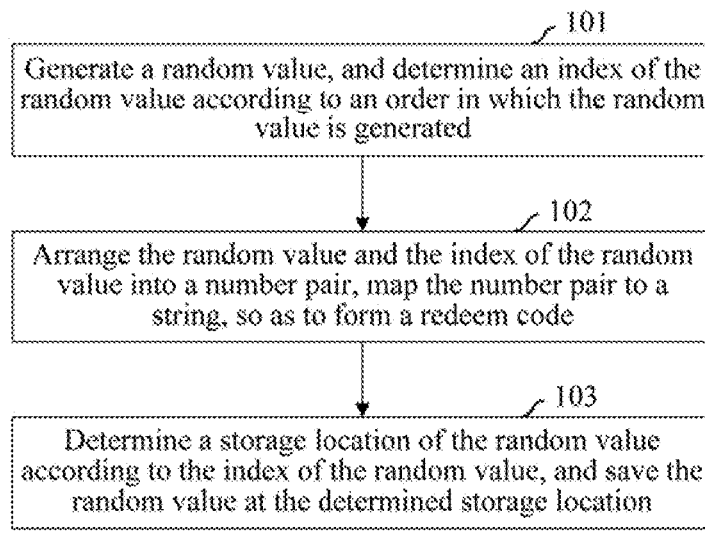
FIG. 1 is a flowchart of a method for storing a redeem code according to various embodiments.

FIG. 1 is a flowchart of a method for storing a redeem code according to various embodiments of the present disclosure. As shown in FIG. 1, the method includes the following blocks:

Block 101: A server generates a random value, and determines an index of the random value according to an order in which the random value is generated.

In this block, the random value may be generated by using various random number generation algorithms, and the index of the random value may be determined according to the order in which the random value is generated.

The index of the random value is determined by using the order in which the random value is generated. In various embodiments of the present disclosure, the index is a continuously incremental positive integer. For example, a random number generation algorithm is applied to generate a random value 123 for a first time, the random number generation algorithm is applied to generate a random value 478 for a second time, and the random number generation algorithm is applied to generate a random value 567 for a third time. It may be determined that an index of the random value 123 is 1, an index of the random value 478 is 2, and an index of the random value 567 is 3.

Block 102: The server arranges the random value and the index of the random value into a number pair, maps the number pair to a string, and uses the string as a redeem code.

In various embodiments of the present disclosure, an obfuscation operation may further be performed on the string obtained through mapping, and the string obtained after the obfuscation operation is performed is used as the redeem code.

In this block, the random value generated in block 101 and the index of the random value are first arranged into the number pair, the number pair is then mapped to the string, the string pair is obfuscated to form the redeem code.

In the implementation manner of the present disclosure, the number pair may be first mapped to the string pair in multiple manners. One method converts by using a number-to-string function (num2str), each number in the number pair into a corresponding base-24 string, so as to map the number pair to a string pair. A new string is then formed according to two strings corresponding to these two values, that is, an index value and the random value. The new string is used as a redeem code, and the string (for example, the base-24 string) may further be obfuscated to strengthen security. The obfuscation operation is a program transformation technology that can be used for protecting intellectual property of mobile code and software, and various existing obfuscation algorithms or an obfuscation algorithm that may appear in the future may be used in the implementation manner of the present disclosure.

In various embodiments of the present disclosure, during a process in which the number pair is converted into the string, numbers from 0 to 23 may be respectively mapped to 24 characters, for example, "0", "1", "2", "3", "4", "5", "6", "7", "8", "9", "A", "B", "C", "D", "E", "F", "G", "H", "I", "J", "K", "L", "M", and "N".

If in block 101, the 50000th random value is 22078136, the number pair is (50000, 22078136), base-24 representation corresponding to the number pair is ("3EJ8", "2ID228"), and the string obtained through mapping in this case is "3EJ82ID228".

The string obtained through mapping may be obfuscated by using various obfuscation algorithms. For example, the string is obfuscated into "3E2ID228J8", so as to use "3E2ID228J8" as a redeem code to be stored.

For another example, it is assumed that in block 101, the 90000th random value is 33069592, the number pair is (90000, 33069592), base-24 representation corresponding to the number pair is ("6C60", "43G4BG"), and the string obtained through mapping in this case is "6C6043G4BG".

Then, the string obtained through mapping may be obfuscated by using various obfuscation algorithms. For example, the string is obfuscated into "6C43G4BG60", so as to use "6C43G4BG60" as a redeem code to be stored.

For another example, it is assumed that in block 101, the 100000th random value is 47892341, the number pair is (100000, 47892341), base-24 representation corresponding to the number pair is ("75EG", "608AA5"), and the string obtained through mapping in this case is "75EG608AA5".

The string obtained through mapping may be obfuscated by using various obfuscation algorithms. For example, the string is obfuscated into "75608AA5EG", so as to use "75608AA5EG" as a redeem code to be stored.

In various embodiments of the present disclosure, there are some visually similar characters among the characters: "0", "1", "2", "3", "4", "5", "6", "7", "8", "9", "A", "B", "C", "D", "E", "F", "G", "H", "I", "J", "K", "L", "M", and "N", and therefore, "3", "4", "5", and "Y" are used as the 24 characters in base-24 conversion.

Although the method of the present disclosure is described above in detail by using the base-24 system as an example, a person skilled in the art may realize that the implementation manner of the present disclosure is not limited to the base-24 system, and is applicable to any base-n system and any mapping algorithm.

Block 103: The server determines a storage location of the random value according to the index of the random value, and saves the random value at the determined storage location.

In various embodiments of the present disclosure, a correspondence between an index and a storage location is saved in a redeem index table.

In this block, the corresponding storage location, of the random value, in the redeem index table may be determined according to the index of the random value in a bitmap, a hash or an array manner, and the random value is saved at the determined storage location.

In various embodiments of the present disclosure, a redeem state bit corresponding to the random value is further saved in the redeem index table and for indicating a redeeming state of the redeem code corresponding to the random value, that is, whether the redeem code is redeemed.

For example, 1 bit may be used as a redeem state bit, and in this case, memory having storage capacity of 1 Mbyte may store redeeming states of 8 million redeem codes.

When there are a huge number of redeem codes, multiple bits may also be used for representing a redeeming state of a redeem code, which is not limited herein by the method of the present disclosure.

For example, the 50000th random value is 22078136, and the random value 22078136 may be stored at a storage location corresponding to the index 50000 in the redeem index table. The 90000th random value is 33069592, and the random value 33069592 may be stored at a storage location corresponding to the index 90000 in the redeem index table. The 100000th random value is 47892341, and the random value 47892341 may be stored at a storage location corresponding to the index 10000 in the redeem index table.

In actual application, the index of the random value does not need to be stored, as long as the storage location of the random value may be determined according to the index value. For example, 22078136 is stored at the 50000th location of an array: (array[5000]=22078136).

In various embodiments of the present disclosure, an expected generation quantity of the redeem code may also be predetermined, and the number of digits of the index is determined according to the expected generation quantity of the redeem code. A probability threshold value of cracking the redeem code is then determined, and the number of digits of the random value is determined according to the probability threshold value of cracking the redeem code.

In this case, the generating a random value, and determining an index of the random value according to an order in which the random value is generated in block 101 includes generating the random value according to the number of digits of the random value, and determining the index of the random value according to the order in which the random value is generated and the number of digits of the index.

An example in which the expected generation quantity is 4 billion and a success probability of cracking is less than one 7.96 millionth is used for description.

$24^7=4586471424$, and the quantity in the range is more than 4.5 billion, and therefore, an index value may occupy 7 characters. $24^7=7962624$, and the quantity in the range is more than 7.96 million, and therefore, a random value may occupy 5 characters. Therefore, the redeem code has 12 characters (12=7+5) in total, 45 billion redeem codes may be generated, and the success probability of cracking is less than one 7.96 millionth.

To further reduce the success rate of cracking, the number of characters of the random value may be increased. For example, when the random value has 6 digits, the success rate of cracking is less than one 190 millionth, and the redeem code totally has 13 characters.

In the method provided in the foregoing various embodiments, a string generated by using an index value and a random value is obfuscated, so that it becomes more difficult for an ordinary user to find a rule from the string. Moreover, each character of the index value and each character of the random value may represent a base-24 value, and therefore a meaning represented by one character may be split, where one part represents an index value, and one part represents a random value. For example, the first bit to the 20th bit represent the random value, and the 21st bit to the 24th bit represent the index value. Moreover, during a process of verifying a redeem code, a redeem index table may also be completely placed in memory in a bitmap, a hash or an array manner, to improve efficiency of search.

Various embodiments of the present disclosure further provides a method for verifying a redeem code.

Figure 2:
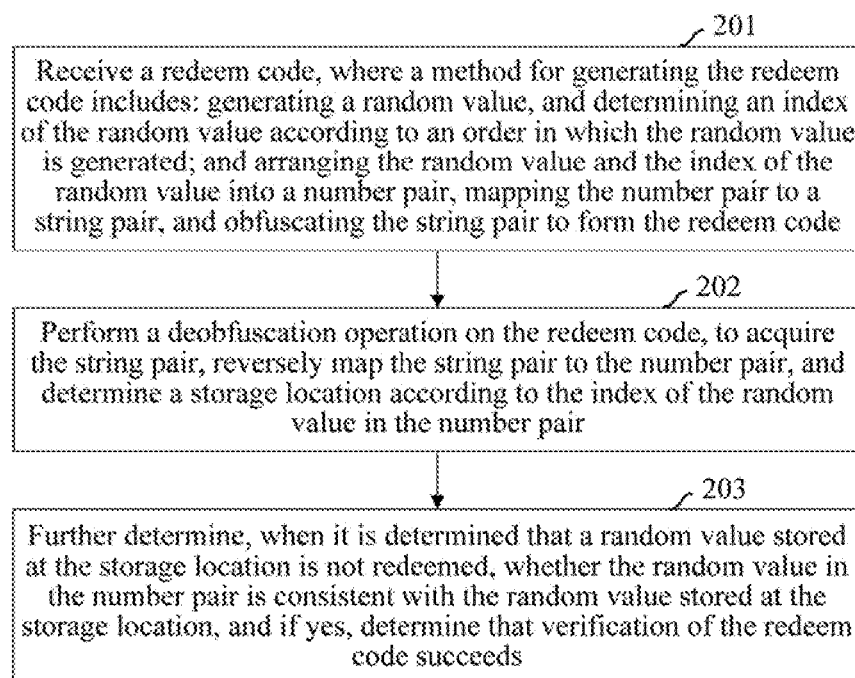
FIG. 2 is a flowchart of a method for verifying a redeem code according to various embodiments.

FIG. 2 is a flowchart of a method for verifying a redeem code according to various embodiments of the present disclosure. As shown in FIG. 2, the method includes the following blocks:

Block 201: A server receives a redeem code, where a method for generating the redeem code includes generating a random value and determining an index of the random value according to an order in which the random value is generated, arranging the random value and the index of the random value into a number pair, mapping the number pair to a string, and obfuscating the string pair to form the redeem code.

In this block, the received redeem code may be a redeem code generated according to the method shown in FIG. 1.

Block 202: Perform a deobfuscation operation on the redeem code, to acquire the string corresponding to the redeem code, so as to determine the string pair corresponding to the redeem code, reversely map the string pair to the number pair, and determine a storage location according to the index of the random value in the number pair.

A deobfuscation operation that is reverse to an obfuscation operation in a process of generating the redeem code is first performed on the redeem code, so as to obtain the original string corresponding to the redeem code. The original string is disassembled into the string pair, and then a reverse mapping operation that is reverse to a mapping operation in the process of generating the redeem code is performed, so as to restore the string pair to the number pair, where the number pair includes the random value and the index of the random value. The storage location of the redeem code is further determined according to the index of the random value in the number pair.

Block 203: The server further determines, when determining that a random value stored at the storage location is not redeemed, whether the random value in the number pair is consistent with the random value stored at the storage location, and if yes, determines that verification of the redeem code succeeds.

In various embodiments of the present disclosure, it may be first determined whether the random value stored at the storage location has already been redeemed, and if the random value stored at the storage location has already been redeemed, it is determined that the verification of the redeem code fails. If the random value stored at the storage location is not redeemed, it is further determined whether the random value in the number pair is consistent with the random value stored at the storage location, and if the random value in the number pair is consistent with the random value stored at the storage location, it is determined that the verification of the redeem code succeeds. If the random value in the number pair is inconsistent with the random value stored at the storage location, it is determined that the verification of the redeem code fails.

In this block, it may be determined, according to a redeem state bit in a redeem index table, whether the random value stored at the storage location has already been redeemed. When it is determined that the random value stored at the storage location has already been redeemed, it is determined that the redeem code has already been redeemed before. Therefore, the verification fails.

When it is determined that the random value stored at the storage location is not redeemed, it is determined that the redeem code has not been redeemed before. The redeem index table is further searched to determine whether the random value obtained in block 202 is consistent with the random value stored at the storage location in the redeem index table, and if the random value obtained in block 202 is consistent with the random value stored at the storage location in the redeem index table, it is determined that the verification of the redeem code succeeds. If the random value obtained in block 202 is inconsistent with the random value stored at the storage location in the redeem index table, it is determined that the verification of the redeem code fails.

In various embodiments of the present disclosure, when it is determined that the verification of the redeem code succeeds, the redeem state bit, corresponding to the random value, in the redeem index table is updated to be in a redeemed state.

By using the method of the present disclosure, the efficiency of generating a redeem code and the efficiency of verifying a redeem code are improved, a process of storing and verifying a redeem code are completely independent of a database, the redeem code is stored and searched according to an index, and a success rate of cracking a redeem code is controllable.

Figure 3:
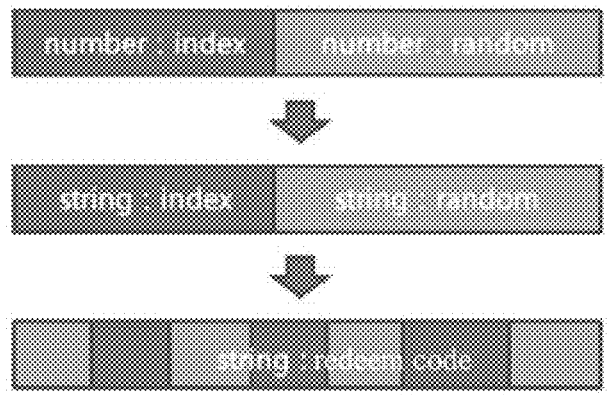
FIG. 3 is a diagram of a process of generating a redeem code according to various embodiments.
Figure 4:
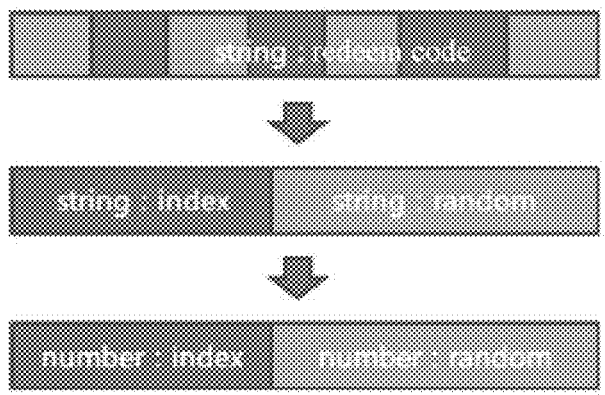
FIG. 4 is a diagram of a process of verifying a redeem code according to various embodiments.

FIG. 3 is a diagram of a process of generating a redeem code according to various embodiments the present disclosure. FIG. 4 is a diagram of a process of verifying a redeem code according to various embodiments of the present disclosure.

According to various embodiments of the present disclosure, an example in which 4 billion redeem codes are generated is used for description.

During a process of generating and storing a redeem code, 4 billion random values in a range of [0, 7962624) are first generated in order. A correspondence between an index and a random value is kept in a redeem index table for use in a subsequent redeeming stage. Index values (input_idx) and random values (input_random) are then converted into 4 billion strings by using a number-to-string function (num2str). 4 billion redeem codes are further formed by the 4 billion strings by using a certain obfuscation algorithm, for example, a change of an order, and are provided for use by a client. Meanwhile, the random values are stored in storage locations corresponding to indexes.

During a process of verifying a redeem code, the redeem code is first restored to a pair of strings by using a deobfuscation operation, and the pair of strings are further converted into a number pair by using a string-to-number function (str2num), where an index value is input_idx, and a random value is input_random. A redeem index table is then searched according to input_idx, where the redeem index table may be a bitmap table, or a hash table or a database table, to determine whether the redeem code has already been redeemed. If the redeem code is not redeemed, a random value, corresponding to input_idx, in the redeem index table is found. The found random value is compared with input_random. If the found random value is the same as input_random, it is determined that verification of the redeem code succeeds, and a redeem state bit corresponding to the redeem code is updated in the redeem index table. If the found random value is different from input_random, it is determined that verification of the redeem code fails.

The method provided in the present disclosure may be implemented in servers in various forms.

Various embodiments of the present disclosure further provide an apparatus for storing a redeem code.

Figure 5:
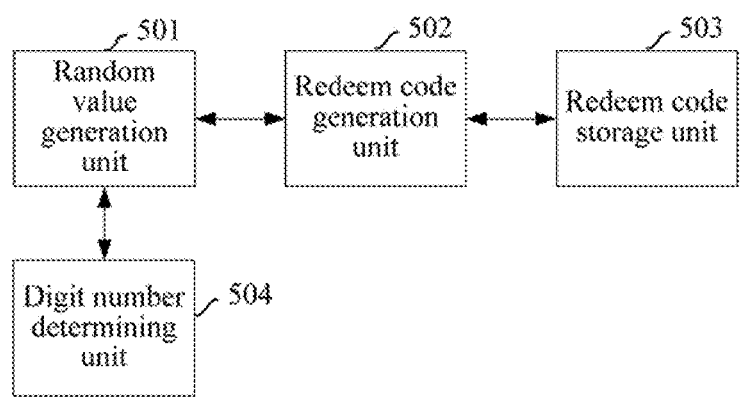
FIG. 5 is a structural diagram of an apparatus for storing a redeem code according to various embodiments.

FIG. 5 is a structural diagram of an apparatus for storing a redeem code according to various embodiments of the present disclosure. As shown in FIG. 5, the apparatus includes a random value generation unit 501, a redeem code generation unit 502, and a redeem code storage unit 503.

The random value generation unit 501 is configured to generate a random value, and determine an index of the random value according to an order in which the random value is generated.

The redeem code generation unit 502 is configured to arrange the random value and the index of the random value into a number pair, and map the number pair to a string, to form a redeem code.

The redeem code storage unit 503 is configured to determine a storage location of the random value according to the index of the random value, and save the random value at the determined storage location.

In various embodiments, the apparatus further includes a digit number determining unit 504.

The digit number determining unit 504 is configured to determine a quantity of the redeem codes, and determine the number of digits of the index according to the quantity of the redeem code; and determine a probability threshold value of cracking the redeem code, and determine the number of digits of the random value according to the probability threshold value of cracking the redeem code.

The random value generation unit 501 is configured to generate the random value according to the number of digits of the random value, and determine the index of the random value according to the order in which the random value is generated and the number of digits of the index.

According to various embodiments of the present disclosure, the redeem code storage unit 502 is configured to determine, in a bitmap, a hash or an array manner, the storage location, of the random value, in a redeem index table according to the index of the random value, save the random value at the determined storage location in the redeem index table, and save, in the redeem index table, a redeem state bit indicating whether the random value is redeemed. The redeem code is further configured to update, when it is determined that verification of the redeem code succeeds, a state of the redeem state bit of the random value at the storage location in the redeem index table to be redeemed.

Various embodiments of the present disclosure further provide an apparatus for verifying a redeem code.

Figure 6:
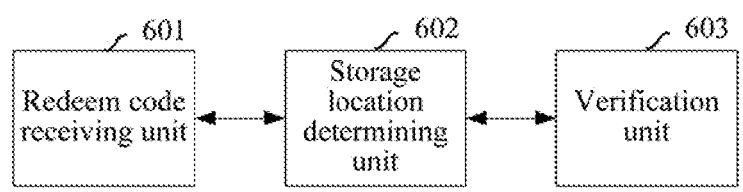
FIG. 6 is a structural diagram of an apparatus for verifying a redeem code according to various embodiments.

FIG. 6 is a structural diagram of an apparatus for verifying a redeem code according to various embodiments of the present disclosure. As shown in FIG. 6, the apparatus includes a redeem code receiving unit 601, a storage location determining unit 602, and a verification unit 603.

The redeem code receiving unit 601 is configured to receive a redeem code, where a method for generating the redeem code includes generating a random value, and determining an index of the random value according to an order in which the random value is generated, arranging the random value and the index of the random value into a number pair, mapping the number pair to a string pair, and obfuscating the string pair to form the redeem code.

The storage location determining unit 602 is configured to perform a deobfuscation operation on the redeem code, acquire the string according to the redeem code, reversely map the string to the number pair, and determine a storage location according to the index of the random value in the number pair.

The verification unit 603 is configured to, when it is determined that a random value stored at the storage location is not redeemed, further determine whether the random value in the number pair is consistent with the random value stored at the storage location, and if yes, determine that verification of the redeem code succeeds.

In various embodiments of the present disclosure, the verification unit 603 determines whether the random value stored at the storage location has already been redeemed; and if the random value stored at the storage location has already been redeemed, determines that the verification of the redeem code fails. If the random value stored at the storage location is not redeemed, the verification unit 603 further determines whether the random value in the number pair is consistent with the random value stored at the storage location, and if the random value in the number pair is consistent with the random value stored at the storage location, determines that the verification of the redeem code succeeds, or if the random value in the number pair is inconsistent with the random value stored at the storage location, determines that the verification of the redeem code fails.

In various embodiments, the verification unit 603 is configured to determine, according to a redeem state bit in a redeem index table, whether the random value stored at the storage location has already been redeemed, and update, when it is determined that the verification of the redeem code succeeds, the redeem state bit, corresponding to the random value, in the redeem index table to be in a redeemed state.

The procedures in the methods shown in FIG. 1 and FIG. 2 and the structures of the apparatuses shown in FIG. 5 and FIG. 6 may be integrated into hardware entities that are in various forms and are used as servers. For example, the procedures of the methods and the structures of the apparatuses may be integrated into a device such as a feature phone, a smart phone, a palmtop computer, a personal computer (PC), a tablet computer, or a personal digital assistant (PDA).

Methods and apparatuses provided by various embodiments of the present disclosure may be implemented by hardware, or a computer readable instruction, or a combination of hardware and a computer readable instruction. The computer-readable instruction used in the various embodiments is stored, by using multiple processors, in a readable storage medium, such as a hard disk, a compact disc read-only memory (CD-ROM), a digital versatile disc (DVD), an optical disc, a floppy disk, a magnetic tape, a random access memory (RAM), a read-only memory (ROM) or another suitable storage device. Alternatively, at least a part of a computer-readable instruction may be replaced by specific hardware such as a custom-made integrated circuit, a gate array, a field programmable gate array (FPGA), a programmable logic device (PLD), and a computer with a specific function.

The various embodiments of the present disclosure provide a computer-readable storage medium for storing an instruction, so that a computer performs the method described in this specification. Systems or devices provided in the various embodiments have a storage medium, in which computer-readable program code is stored, for implementing a function of any embodiment described above, and these systems or devices (or central processing units (CPUs) or microprocessor units (MPUs)) can read and perform the program code stored in the storage medium.

In this case, the program code read from the storage medium may implement any embodiment described above, and therefore, the program code and the storage medium storing the program code are a part of the technical methods.

The storage medium used for providing the program code includes a floppy disk, a hard disk, a magneto-optical disk, an optical disc (such as a CD-ROM, a compact disc recordable (CD-R), a compact disc rewritable (CD-RW), a DVD-ROM, a DVD-RAM, a DVD-RW, a DVD+RW), a magnetic disk, a flash card, and a ROM. Optionally, the program code may also be downloaded from a server computer by using a communications network.

It should be noted that, for the program code executed by the computer, at least a part of operations implemented by the program code may be implemented by an operating system running on the computer, so as to implement the technical methods of any embodiment described above, where the computer executes an instruction based on the program code.

In addition, the program code in the storage medium is written into a memory, where the memory is located in an expansion card inserted into the computer or is located in an expansion unit connected to the computer. In the various embodiments, a CPU in the expansion card or the expansion unit performs, based on the program code, at least a part of operations according to an instruction, so as to implement the technical methods of any embodiment described above.

Actually, the method for storing and/or verifying a redeem code provided in the implementation manners of the present disclosure may beimplemented in multiple manners. For example, an apparatus for running a computer file may be written, by using an application program interface following a certain standard, as a plug-in that is installed in a computer system, or may also be encapsulated into an application program for being downloaded by a user to use. When the apparatus for running a computer file is written as the plug-in, the plug-in may be implemented in multiple forms of plug-ins, for example, an ocx form, a dll form, or a cab form. The apparatus for storing and/or verifying a redeem code provided in the implementation manners of the present disclosure may also be implemented by using technology such as a Flash plug-in, a RealPlayer plug-in, an MMS plug-in, an MIDI staff plug-in, or an ActiveX plug-in.

In summary, in the implementation manners of the present disclosure, a redeem code is set to a mapping rule between a string and a number, and each redeem code consists of a pair of numbers, where one number is a random value, and the other number is an index related to an order in which the random value is generated. During a stage of generating a redeem code, a number pair is mapped to a string, and when the redeem code is saved, only a random value needs to be stored. Therefore, in a case of ensuring that a success rate of cracking a redeem code is controllable, data storage space may further be saved.

Moreover, in the various embodiments of the present disclosure, during a redeeming stage, a string is mapped to a number pair for verification, thereby improving efficiency of verifying a redeem code.

In addition, the various embodiments of the present disclosure may be applied to various terminals, and the various embodiments of the present disclosure may be used across platforms or across terminals, which have a very wide range of application.

The foregoing descriptions are merely preferred embodiments of the present disclosure, and are not used to limit the protection scope of the present disclosure. Any modification, equivalent replacement, and improvement made without departing from the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. A method for verifying a redeem code, the method comprising:
   receiving the redeem code, the redeem code being generated by generating a random value and determining an index of the random value according to an order in which the random value is generated, generating a number pair according to the random value and the index of the random value, mapping the number pair to a string, and generating the redeem code by obfuscating the string, the index of the random value being a positive integer value;
   acquiring, by one or more processors, the string by deobfuscating the redeem code, reversely mapping the string to the number pair, and determining a storage location that stores a random value in a redeem index table according to the index of the random value in the number pair, the redeem index table indicating whether the random value has been redeemed;
   further determining, by the one or more processors in response to determining that the random value stored at the storage location is not redeemed, whether the random value in the number pair is consistent with the random value stored at the storage location; and
   determining, by the one or more processors, that verification of the redeem code succeeds when the random value in the number pair is determined to be consistent with the random value stored at the storage location, wherein
   the mapping the number pair to the string includes converting, by using a number-to-string function (num2str), each number in the number pair into a corresponding base-24 string, and forming the string according to the corresponding base-24 string associated with each number; and
   the reversely mapping the string to the number pair includes converting, by using a string-to-number function (str2num), each base-24 string in the string into the corresponding number, and forming the number pair according to each corresponding number.

2. The method for verifying the redeem code according to claim 1, wherein
   the determining that the random value stored at the storage location is not redeemed includes determining, according to a redeem state bit that is in the redeem index table and indicates whether the random value stored at the storage location is redeemed, whether the random value stored at the storage location has already been redeemed; and
   the method further includes updating, in response to determining that the verification of the redeem code succeeds, the redeem state bit of the random value at the storage location in the redeem index table to be in a redeemed state.

3. An apparatus for verifying a redeem code, comprising a memory; and
   one or more processors configured to execute one or more programs stored in the memory which causes the one or more processors to
      receive the redeem code, the redeem code being generated by generating a random value and determining an index of the random value according to an order in which the random value is generated, generating a number pair according to the random value and the index of the random value, mapping the number pair to a string, and generating the redeem code by obfuscating the string, the index of the random value being a positive integer value;
      acquire the string by deobfuscating the redeem code, reversely map the string to the number pair, and determine a storage location that stores a random value in a redeem index table according to the index of the random value in the number pair, the redeem index table indicating whether the random value has been redeemed;
      determine, in response to determining that the random value stored at the storage location is not redeemed, whether the random value in the number pair is consistent with the random value stored at the storage location; and
      determine that verification of the redeem code succeeds when the random value in the number pair is determined to be consistent with the random value stored at the storage location, wherein
   the number pair is mapped to the string by converting, by using a number-to-string function (num2str), each number in the number pair into a corresponding base-24 string, and forming the string according to the corresponding base-24 string associated with each number; and
   the string is reversely mapped to the number pair by converting, by using a string-to-number function (str2num), each base-24 string in the string into the corresponding number, and forming the number pair according to each corresponding number.

4. The apparatus for verifying the redeem code according to claim 3, wherein
   the one or more processors is configured to determine, according to a redeem state bit that is in the redeem index table and indicates whether the random value stored at the storage location is redeemed, whether the random value stored at the storage location has already been redeemed, and is further configured to, in response to determining that the verification of the redeem code succeeds, update the redeem state bit of the random value at the storage location in the redeem index table to be in a redeemed state.

5. A non-transitory computer-readable storage medium storing program code which when executed by one or more processors cause the one or more processors to perform:

receiving the redeem code, the redeem code being generated by generating a random value and determining an index of the random value according to an order in which the random value is generated, generating a number pair according to the random value and the index of the random value, mapping the number pair to a string, and generating the redeem code by obfuscating the string, the index of the random value being a positive integer value;

acquiring the string by deobfuscating the redeem code, reversely mapping the string to the number pair, and determining a storage location that stores a random value in a redeem index table according to the index of the random value in the number pair, the redeem index table indicating whether the random value has been redeemed;

further determining, in response to determining that the random value stored at the storage location is not redeemed, whether the random value in the number pair is consistent with the random value stored at the storage location; and determining that verification of the redeem code succeeds when the random value in the number pair is determined to be consistent with the random value stored at the storage location, wherein the mapping the number pair to the string includes converting, by using a number-to-string function (num2str), each number in the number pair into a corresponding base-24 string, and forming the string according to the corresponding base-24 string associated with each number; and the reversely mapping the string to the number pair includes converting, by using a string-to-number function (str2num), each base-24 string in the string into the corresponding number, and forming the number pair according to each corresponding number.

6. The non-transitory computer-readable storage medium according to claim 5, wherein the determining that the random value stored at the storage location is not redeemed includes determining, according to a redeem state bit that is in the redeem index table and indicates whether the random value stored at the storage location is redeemed, whether the random value stored at the storage location has already been redeemed; and the method further includes updating, in response to determining that the verification of the redeem code succeeds, the redeem state bit of the random value at the storage location in the redeem index table to be in a redeemed state.

* * * * *